United States Patent
Motupalli et al.

(10) Patent No.: US 10,767,061 B2
(45) Date of Patent: Sep. 8, 2020

(54) PLASTISOL BASED COMPOSITION FOR BLOCKING DYE MIGRATION FROM DYED POLYESTER FABRIC INTO THE PRINT

(71) Applicant: FUJIFILM SERICOL INDIA PVT. LTD., District: Pune, Maharashtra (IN)

(72) Inventors: Prasanna Raghav Rao Motupalli, Telengana (IN); Narendra Koteswara Rao Kammili, Maharashtra (IN)

(73) Assignee: FUJIFILM SERICOL INDIA PVT. LTD., Maharashtra (IN)

( * ) Notice: Subject to any disclaimer, the term of this patent is extended or adjusted under 35 U.S.C. 154(b) by 386 days.

(21) Appl. No.: 15/707,045

(22) Filed: Sep. 18, 2017

(65) Prior Publication Data

US 2018/0127602 A1    May 10, 2018

Related U.S. Application Data

(63) Continuation-in-part of application No. 14/576,726, filed on Dec. 19, 2014, now abandoned.

(30) Foreign Application Priority Data

Jun. 10, 2014   (IN) .......................... 1899/MUM/2014

(51) Int. Cl.
| | | |
|---|---|---|
| C09D 11/03 | (2014.01) | |
| C09D 11/107 | (2014.01) | |
| D06M 15/507 | (2006.01) | |
| D06M 15/21 | (2006.01) | |
| D06M 13/328 | (2006.01) | |
| C09D 11/104 | (2014.01) | |
| D06M 11/79 | (2006.01) | |
| D06M 11/56 | (2006.01) | |
| D06M 15/71 | (2006.01) | |
| D06M 13/256 | (2006.01) | |
| D06M 13/224 | (2006.01) | |
| D06P 3/52 | (2006.01) | |
| D06P 3/82 | (2006.01) | |
| D06P 1/52 | (2006.01) | |
| D06P 1/673 | (2006.01) | |
| D06M 101/32 | (2006.01) | |
| D06P 1/62 | (2006.01) | |

(52) U.S. Cl.
CPC ............ *C09D 11/03* (2013.01); *C09D 11/104* (2013.01); *C09D 11/107* (2013.01); *D06M 11/56* (2013.01); *D06M 11/79* (2013.01); *D06M 13/224* (2013.01); *D06M 13/256* (2013.01); *D06M 13/328* (2013.01); *D06M 15/21* (2013.01); *D06M 15/507* (2013.01); *D06M 15/71* (2013.01); *D06P 1/525* (2013.01); *D06P 1/67383* (2013.01); *D06P 3/52* (2013.01); *D06P 3/8223* (2013.01); *D06M 2101/32* (2013.01); *D06M 2200/00* (2013.01); *D06P 1/623* (2013.01)

(58) Field of Classification Search
CPC ..... C09D 11/03; C09D 11/107; C09D 11/104; D06M 15/507; D06M 15/21; D06M 15/71; D06M 13/328; D06M 13/256; D06M 13/224; D06M 11/79; D06M 11/56; D06M 2200/00; D06M 2101/32; D06P 3/52; D06P 3/8233; D06P 1/525; D06P 1/67383; D06P 1/623
USPC ........................................................ 524/296
See application file for complete search history.

(56) References Cited

U.S. PATENT DOCUMENTS

| | | | | |
|---|---|---|---|---|
| 5,846,266 | A * | 12/1998 | Rattee | D06P 1/62 8/457 |
| 7,732,041 | B2 * | 6/2010 | Grandhee | C09D 11/102 428/195.1 |
| 9,309,183 | B2 * | 4/2016 | Storzum | C07C 67/08 |
| 2007/0050914 | A1 * | 3/2007 | Kitagawa | D06P 5/153 8/115.51 |
| 2015/0232411 | A1 * | 8/2015 | Storzum | C07C 69/82 524/297 |

* cited by examiner

*Primary Examiner* — Michael Bernshteyn
(74) *Attorney, Agent, or Firm* — Whiteford, Taylor & Preston, LLP; Peter J. Davis

(57) ABSTRACT

The present disclosure relates to a plastisol based composition for blocking dye migration from a dyed polyester blended cotton fabric or 100% polyester fabric into a print on the fabric, the print being done with a plastisol based color dye on the dyed fabric. The plastisol based composition of the present disclosure comprises an acrylic based resin devoid of vinyl chloride moiety, a plasticizer, an organic wetting agent, a formaldehyde free discharge agent and an extender. A process for printing fabrics using the plastisol based composition of the present disclosure is also disclosed.

10 Claims, No Drawings

PLASTISOL BASED COMPOSITION FOR BLOCKING DYE MIGRATION FROM DYED POLYESTER FABRIC INTO THE PRINT

CROSS-REFERENCE TO RELATED APPLICATIONS

This application is a continuation-in-part of U.S. application Ser. No. 14/576,726, filed on Dec. 19, 2014 from which, as applicable, priority is claimed under 35 U.S.C. sctn. 120 and under provisions of the Patent Cooperation Treaty. The U.S. application Ser. No. 14/576,726 takes the priority from the Indian Patent Application No. 1899/MUM/2014 filed on Jun. 10, 2014.

FIELD

The present disclosure relates to a plastisol based composition for blocking dye migration from a dyed polyester blended cotton fabric or a 100% polyester fabric into a print on the fabric.

Definition

As used in the present disclosure, the following word is generally intended to have the meaning as set forth below, except to the extent that the context in which they are used to indicate otherwise.

Plastisol: The term "plastisol" refers to a dispersion of fine polymer particles in a liquid plasticizer and is devoid of water, in accordance with an explanation provided in EP1506263. Under ambient storage conditions the polymer does not dissolve to any extent in the plasticizer, but on heating to temperatures typically above 100° C. the plastisol composition gels to form a homogenous coalesced mass that retains its gelled form on cooling.

BACKGROUND

Most textiles are colored with dyes which fix chemically to the textile fabrics. Coloring of the fabric is achieved without a noticeable change in the feel of the fabric itself. The chemical composition of the dye varies according to the fabric used i.e., different dyes are required for different fabrics. Some fabrics contain a proportion of dye which is not sufficiently fixed to the fibres; this happens more frequently for blended fabrics. This residual dye is usually removed during the process of manufacturing the fabric; but if the residual dye is not removed completely, the action of water will wash out the unfixed dyes during washing. This can cause discoloration of the whole fabric. This phenomenon is called "Dye Bleeding". Dye bleeding is normally seen with disperse dyes when used for dyeing polyester fabrics, although it may also be seen with fabric blends, such as polyester-cotton blends.

In case of polyester fabric printed with ink of plastisol type, the unfixed disperse dyes in the fabric has a tendency to dissolve in the plasticizer of the plastisol inks with or without the need of external heat that is normally used to cure the printed area. This is called leaching of the dyes into the plasticizer or plastisol ink. This phenomenon of leaching is known as "Dye Migration" and can cause discoloration of the fabric as well as the printed image. The printed image will change from its original color, which is undesirable. The potential for dye migration is often not evident following printing and curing, and can occur subsequently anytime, within a few hours to a number of weeks.

The plastisol inks are normally heated (cured) at temperatures above 140° C. The dye leaching effect may be more severe resulting in fast discoloration of the printed image, when the plastisol printed fabrics are heated to this high temperature.

The disperse dyes also have a tendency to sublimate when heated, turning from a solid dye particle directly to a gas. This process can be accelerated by solvation due to the plasticizer.

Hybrids of plastisol inks and water-based discharge inks were used to stop dye bleeding. These inks contained a blend of polyvinyl chloride (PVC), phthalate-containing plastisol and an activated water-based discharge ink. This type of ink is unstable and contains PVC and phthalates. Further, the activator for the discharge ink is based on Zinc Formaldehyde Sulphoxylate (ZFS). Even though the discharge agent is very efficient, the composition contains formaldehyde which is detrimental to human health and the environment.

Therefore, there is a need for an effective plastisol based composition, which will completely stop the dye migration from a dyed polyester blended cotton fabric or a 100% polyester fabric to the print.

SUMMARY

Some of the objects of the present disclosure, which at least one embodiment herein satisfies, are as follows:

It is an object of the present disclosure to ameliorate one or more problems of the prior art or to at least provide a useful alternative.

It is an object of the present disclosure to provide a plastisol based composition that stops dye migration from a dyed polyester blended cotton fabric or a 100% polyester fabric into a print on the fabric.

It is another object of the present disclosure to provide a plastisol based composition which is environment friendly.

Other objects and advantages of the present disclosure will be more apparent from the following description, which is not intended to limit the scope of the present disclosure.

The present disclosure provides a plastisol based composition for use on a dyed polyester blended cotton fabric or 100% polyester fabric for blocking dye migration from the fabric into a print on the fabric, wherein the print is an overprint done with a plastisol based color dye on a layer of the dye blocking compound applied on the dyed fabric. The plastisol based composition comprises an acrylic based resin devoid of vinyl chloride moiety in an amount in the range of 15 to 45 wt % of the total weight of the composition, a plasticizer in an amount in the range of 20 to 55 wt % of the total weight of the composition, an organic wetting agent in an amount in the range of 5 to 35 wt % of the total weight of the composition, a formaldehyde free discharge agent in an amount in the range of 2 to 30 wt % of the total weight of the composition, and an extender in an amount in the range of 3 to 40 wt % of the total weight of the composition. The plastisol based composition for blocking the dye migration is in the form of an ink and is devoid of water, formaldehyde, phthalate and vinyl chloride.

The present disclosure further provides a process for printing a plastisol based color ink on a blended polyester dyed cotton fabric or 100% polyester dyed fabric using the plastisol based composition for blocking the dye migration from fabric into the print.

DETAILED DESCRIPTION

The present disclosure envisages a plastisol based composition for blocking dye migration, which when printed on a dyed polyester blended cotton fabric or 100% polyester fabric (a) bleaches the dye on the surface of the fabric with the discharge agents present in the ink; and (b) forms a protective layer on top of the fabric with the additives present in the ink, which stops migration of dye from the fabric into the print. The plastisol based composition is printed in conjunction with a plastisol based white ink. The plastisol based white ink is overprinted on the plastisol based composition, thus completely stopping any dye migration into the print.

In one aspect of the present disclosure, there is provided a plastisol based composition for use on a dyed polyester blended cotton fabric or 100% polyester fabric for blocking dye migration from the fabric into a print on the fabric, wherein the print is an overprint done with a plastisol based color dye on a layer of the dye blocking compound applied on the dyed fabric. The plastisol based composition comprises an acrylic based resin devoid of vinyl chloride moiety in an amount in the range of 15 to 45 wt % of the total weight of the composition, a plasticizer in an amount in the range of 20 to 55 wt % of the total weight of the composition, an organic wetting agent in an amount in the range of 5 to 35 wt % of the total weight of the composition, a formaldehyde free discharge agent in an amount in the range of 2 to 30 wt % of the total weight of the composition, and an extender in an amount in the range of 3 to 40 wt % of the total weight of the composition. The plastisol based composition is in the form of an ink and is devoid of water, formaldehyde, phthalate and vinyl chloride.

The composition of the present disclosure comprises both acrylic based resin and plasticizer, thereby the composition of the present disclosure is referred to as plastisol based composition.

In accordance with an embodiment of the present disclosure, the acrylic based resin is Kane Ace 4944F (Kaneka Belgium Nev.) and LP-3207 (Dianal). The acrylic based resins of the present disclosure are devoid of vinyl chloride moiety. The acrylic based resins containing vinyl chloride moiety are highly toxic, flammable, and carcinogenic. In contrast, the plastisol based composition of the present disclosure is environment friendly as it is free of vinyl chloride moiety.

The amount of the acrylic based resin devoid of vinyl chloride moiety in the plastisol based composition is in the range of 15 to 45 wt % of the total weight of the composition, preferably from 20 to 35 wt % of the total weight of the composition.

In accordance with an embodiment of the present disclosure, the plasticizer is at least one selected from the group consisting of polyester adipate, 1,2 cyclohexane dicarboxylic acid diisononyl ester, and 2,2,4-trimethyl-1,3-pentanediol dibenzoate. The plasticizers used in the plastisol based composition of the present disclosure are polymeric plasticizers, which are large molecules and have low volatility, thereby, reducing the dissolution of the dye molecules. Hence, the plastisol based composition of the present disclosure reduces the leaching of the dye from the dyed fabric into the print.

Further, plasticizers of the plastisol based composition forms a tough film with the acrylic based resin of the present disclosure, which prevents the dye from dissolving in the polymeric plasticizer and from migrating to the upper layer consisting of plastisol based white ink film. Since, the composition of the present disclosure is devoid of water, the plastisol based composition can be cured at high temperatures which overall increases the productivity as compared to the water based system, which cannot be cured at high temperatures. Further, the plastisol based composition of the present disclosure is hydrophobic in nature and forms a gel when water is used. The so formed gel does not have the dye blocking properties of the plastisol based composition and hence cannot be used as ink.

In accordance with an embodiment of the present disclosure, the amount of the plasticizer in the plastisol based composition is in the range of 20 to 55 wt % of the total weight of the composition, preferably from 30 to 45 wt %% of the total weight of the composition.

In accordance with an embodiment of the present disclosure, the organic wetting agent is at least one selected from white spirit and mineral turpentine. The organic wetting agent controls the viscosity of the plastisol based composition that helps the fabric to get wet to obtain uniform film.

In accordance with an embodiment of the present disclosure, the amount of the organic wetting agent in the plastisol based composition is in the range of 5 to 35 wt %, preferably from 15 to 25 wt %.

In accordance with an embodiment of the present disclosure, the formaldehyde free discharge agent is an organic sulfur compound comprising at least one oxide of sulfur residue.

The formaldehyde free discharge agent is represented by Formula I below:

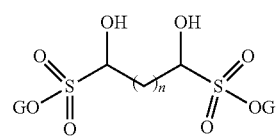

Formula I wherein G represents a group 1 metal; and n is in the range of 1 to 6.

The group 1 metal of the present disclosure is selected from sodium and potassium.

Optionally, the discharge agent can also have a metal salt and/or an amine.

In an embodiment of the present disclosure, the metal salt is at least one selected from the group consisting of sulfate, chloride, nitrate, and acetate.

In an exemplary embodiment of the present disclosure, the metal salt is zinc sulfate.

In an exemplary embodiment of the present disclosure, the formaldehyde free discharge agent is zinc sulfate heptahydrate.

In another embodiment of the present disclosure, the amine is at least one selected from the group consisting of mono-ethanolamine, di-ethanolamine, tri-ethanolamine, mono-isopropanolamine, and di-isopropanolamine.

In accordance with an embodiment of the present disclosure, the amount of the formaldehyde free discharge agent in the plastisol based composition is in the range of 2 to 30 wt % of the total weight of the composition, preferably from 5 to 15 wt % of the total weight of the composition. Since, the discharge agent of the present disclosure is formaldehyde free, which is carcinogenic, the plastisol based composition of the present disclosure is environment friendly. Also, the discharge agents help to control the pH of the composition that increases shelf-life of the composition at the time of printing.

The formaldehyde free discharge agent is capable of destroying the chromogenic system of the dyes under appropriate heating/curing conditions of the fabric and partially bleaching the dye from the fabric. This process turns the original fabric color to a much lighter color. The heating and curing conditions typically consists of infra-red flash curing or steam curing, immediately following the printing process.

The plastisol based composition of the present disclosure comprises an extender. These dye absorbing extenders have a very high surface area, which serves to absorb the residual dyes on the fabric after dyeing. The dye absorbing extender can be locked into the system with the resin during the curing process, providing an impermeable surface for further printing with special plastisol based white ink. Further, the plastisol based composition of the present disclosure comprises an extender powder to increase viscosity that results in improved hold-out on porous fabrics.

In accordance with an embodiment of the present disclosure, the extender is at least one selected from the group consisting of zeolite, activated carbon, fumed silica and hydrophilic silica.

The amount of the extender in the plastisol based composition is in the range of 3 to 40 wt % of the total weight of the composition, preferably from 5 to 20 wt % of the total weight of the composition.

In accordance with another embodiment of the present disclosure, a cross-linking agent is used to reduce the curing temperature. The cross-linking agent of the present disclosure can be aziridine. The cross-linking agent is added for the better fixing of the plastisol based composition on the fabric.

The coloring agent in accordance with the present disclosure is selected from the group comprising titanium dioxide ($TiO_2$) of Rutile and Anatase pigment grade.

In an exemplary embodiment of the present disclosure, there is provided a plastisol based composition for use on a dyed polyester blended cotton fabric or 100% polyester fabric for blocking dye migration from the fabric into a print on the fabric, wherein the print is an overprint done with a plastisol based color dye on a layer of the dye blocking compound applied on the dyed fabric. The composition comprises 31 wt % of acrylic resin with respect to the total weight of the composition, 34.5 wt % of polyester adipate with respect to the total weight of the composition, 10 wt % of 1,2-cyclohexane dicarboxylic acid diisononyl ester with respect to the total weight of the composition, 8 wt % of white spirit with respect to the total weight of the composition, 9 wt % of zinc sulfate heptahydrate with respect to the total weight of the composition, 2 wt % of 2-amino-2-methyl-1-propanol solution with respect to the total weight of the composition, zeolite in an amount of 5 wt % of the total weight of the composition, and 0.5 wt % of aerosol with respect to the total weight of the composition, In accordance with another aspect of the present disclosure, there is provided a process for printing a plastisol based color ink on a dyed polyester blended cotton fabric or 100% polyester dyed fabric using the plastisol based composition for blocking the dye migration from fabric into the print. The process comprising the following steps:

Initially, a plastisol based base is prepared by mixing the plastisol based composition, prepared in accordance with the present disclosure, with an organic reducing agent which is methane sulphonic acid 1-hydroxy sodium salt in a ratio of 100:10 to obtain a homogenous mixture. The obtained homogenous mixture has a shelf life of about 8 to 12 hours depending upon the storage temperature.

In a first step, at least two strokes of a plastisol based base are applied on the blended polyester dyed cotton fabric or 100% polyester dyed fabric to obtain a layer on the fabric using a monofilament polyester mesh ranging from 43T to 55T. The formaldehyde free discharge agent present in the plastisol based composition bleaches the dye on the surface of the fabric and forms a protective layer on the fabric.

In a second step, the layer on the fabric is flash cured at a temperature in the range of 90 to 110° C. for a time period in the range of 2 to 6 seconds to obtain a flash cured plastisol based base layer on the fabric. The layer should not be flash cured for more than 6 seconds as it may result in the shrinking of the 100% polyester fabric.

In a third step, after the flash cured plastisol based base layer is dry, at least two strokes of a plastisol based white ink are applied over the flash cured plastisol based base layer on the fabric using a monofilament polyester mesh ranging from 43T to 55T, followed by flash curing the plastisol based white ink at a temperature in the range of 90 to 100° C. for a time period in the range of 2 to 6 seconds to obtain a flash cured plastisol based white ink;

In a fourth step, once a flash cured plastisol based white ink is dry, a plastisol based color ink is applied over the flash cured plastisol based white ink on the fabric to obtain a plastisol based color print on the fabric using monofilament polyester mesh ranging from 43T to 77T.

In a fifth step, the plastisol based color print on the fabric is cured at a temperature in the range of 140 to 180° C. for a time period in the range of 60 to 120 seconds to obtain the printed dyed fabric.

Optionally, the plastisol based color ink can be applied directly to the plastisol based base of the present disclosure without the application of the plastisol based white ink.

The plastisol based composition of the present disclosure can be used for printing a blended polyester dyed fabric or 100% polyester dyed fabric by screen printing by manual/table/automatic machine printing.

The plastisol based composition according to the present disclosure employs acrylic based resins devoid of vinyl chloride moiety, plasticizers, an organic wetting agent, formaldehyde-free discharge agent, and extender to absorb residual dye, and a white plastisol ink to be over printed on the plastisol based composition. The low bleed flash-cure white plastisol ink when over printed on the plastisol based composition, gives a white base for printing plastisol based colors to create required images on the fabric.

The present disclosure is further described in light of the following laboratory scale experiments which are set forth for illustration purpose only and not to be construed for limiting the scope of the disclosure. The experiments used herein are intended merely to facilitate an understanding of ways in which the embodiments herein may be practiced and to further enable those of skill in the art to practice the embodiments herein. These laboratory experiments can be scaled up to industrial/commercial scale and the results obtained can be extrapolated to industrial/commercial scale.

EXPERIMENTS

Experiment 1: Preparation of Plastisol Based Composition (Formula 1)

The setup consisted of a stainless steel double jacketed pot having a provision of recirculating water at a temperature of 20° C. 29 g of Kane Ace 4944F (Kaneka, molecular weight: 700,000 g/mol), 41 g of 2,2,4-trimethyl-1,3-pentanediol dibenzoate, 8.5 g of Zinc Sulfate Heptahydrate and 5 g of Zeolite 13X was charged into the stainless steel double jacketed pot to obtain a pre-mixture. This pre-mixture was maintained at a temperature of 25° C. The pre-mixture was mixed in a Variable Frequency Drive (VFD) Mixer having a side scraper for 30 minutes at 500 rpm to obtain a mixture. The mixture was then milled in a triple roll mill at 20 kg/cm² pressure of feed roll and discharge roll, until the mill base passed through the mill to obtain a milled base. The milling process was repeated till a mill base of size <5 microns was obtained on a Hegman gauge. The milled base was again thoroughly mixed in the VFD mixer, having a side scraper, at 500 rpm for 30 minutes. 8 g of white spirit and 8 g of 2-Amino-2-Methyl-1-Propanol Solution (AMP-95) were charged to the mixed and milled base and again mixed in the VFD mixer at 500 rpm for 40 minutes. Finally, 0.5 g of aerosil was charged to the mixture and the viscosity was adjusted to 40 poise.

Experiment 2: Preparation of Plastisol Based Composition (Formula 2)

The setup consisted of a stainless steel double jacketed pot having a provision of recirculating water at a temperature of 20° C. 31 g of LP-3207 (Dianal), 34.5 g of polyester adipate, 10 g of 1,2-cyclohexane dicarboxylic acid diisononyl ester, 9 g of Zinc Sulfate Heptahydrate and 5 g of activated charcoal was charged into the stainless steel double jacketed pot to obtain a pre-mixture. This pre-mixture was maintained at a temperature of 25° C. The pre-mixture was mixed in a Variable Frequency Drive (VFD) Mixer having a side scraper for 30 minutes at 500 rpm to obtain a mixture. The mixture was then milled in a triple roll mill at 20 kg/cm² pressure of feed roll and discharge roll, until the mill base passed through the mill to obtain a milled base. The milling process was repeated till a mill base of size <5 microns was obtained on a Hegman gauge. The milled base was again thoroughly mixed in the VFD mixer, having a side scraper, at 500 rpm for 30 minutes. 8 g of white spirit and 2 g of 2-Amino-2-Methyl-1-Propanol Solution (AMP-95) were charged to the mixed and milled base and again mixed in the VFD mixer at 500 rpm for 40 minutes. Finally, 0.5 g of aerosil was charged to the mixture and the viscosity was adjusted to 40 poise.

Experiment 3: Preparing the Plastisol Based Base 100 parts of the Formula 1 prepared in Experiment 1 was mixed thoroughly with 10 parts of methane sulphonic acid 1-hydroxy sodium salt using a spatula to obtain a homogenous mixture of plastisol based base.

Experiment 4: Printing the Plastisol Based Base Comprising Plastisol Based Composition of Formula 1 on a Fabric The plastisol based base prepared in Experiment 3 was printed on a 100% polyester fabric using a 43T mesh. Two strokes of the plastisol based base were applied on the fabric. The print was flash cured at a temperature of 110° C. for 4 seconds. After the print was touch dry, a second layer of YC.757 (Fujifilm, plastisol based white ink) using a monofilament polyester mesh (43T mesh) was applied on the fabric already printed with the plastisol based base. Two strokes of YC.757 were applied using a monofilament polyester mesh (43T mesh) and then flash cured at a temperature of 100° C. for 4 seconds. After the layer of YC.757 was touch dry, a final layer of YC.077 (Fujifilm, plastisol based color ink) was applied using monofilament polyester mesh (77T mesh) and cured at a temperature of 160° C. for 90 seconds.

The fabric after printing was subjected to washing (5 cycles) and heat treatment at 90° C. for 24 hours.

| Wash Test of the printed fabric Wash Conditions | |
|---|---|
| Machine | Miele PW 6065 |
| Load Weight | 2.0 Kg |
| Wash Temperature | 60° C. |
| Wash Program | Normal |
| Time | 60 minutes |
| Spin Speed | 1000 rpm |
| Detergent | 30 g Persil Powder |
| Number of Wash and Dry Cycles | 5 |

| Drying Conditions for the washed fabrics | |
|---|---|
| Machine Tumble Dry | 50 minutes |

Exhaust less than or equal to 70° C.

The comparative results of the L, a, b values of the plastisol based composition of the present disclosure, 'As Such' (the first reading taken after printing, without washing/heat treatment) values, after washing and heat treatment are illustrated in the Tables 1 to 6, wherein 1' indicates lightness/darkness, 'a' indicates red/green coordinates, and 'b' indicates yellow/blue coordinates.

For the evaluation of the plastisol based composition the L values were considered. The standard taken here to compare the color variation was the color printed on the 100% white cotton. 100% white cotton was first printed with an YC.757 plastisol based white layer and then a plastisol based color layer was printed on the white layer. The L, a, b values of the color printed on white cotton was taken as a standard because it does not have a dye that will migrate to the top color, turning the color towards a darker shade.

Tables 1 to 6 illustrates the L, a, b Values of different color dyes (YC.077, YC.021, YC.042, YC.134, YC.165, and YC.119) printed on 100% black polyester and 60:40 polyester: cotton blend, having a YC.757 white base. The readings were taken of 'As Such' prints. The values after it was subjected to heat test at 90° C. for 24 hours and values of prints after 5 wash test. These values are taken as standard for comparison. The values of 'As Such' prints on white garments are compared with 'As Such' prints on fabric printed with and without the plastisol based composition. The values of prints subjected to heat test are compared with fabric printed with and without the plastisol based composition.

TABLE 1

| | | W/O Dye Blocker Garment | | | | Formula 1, YC.021 | |
|---|---|---|---|---|---|---|---|
| | | White taken as Standard Layer1: YC.757 Layer2: YC.021 | 100% Black Polyester Layer1: YC.757 Layer2: YC.021 | Difference as compared to Standard | 60:40 Polyester Blend Layer1: YC.757 Layer2: YC.021 | Difference as compared to Standard | 100% Black Polyester Layer1: Formula 1 Layer2: YC.757 Layer3: YC.021 | Difference as compared to Standard |
| | LABCH Values | | | | | | | |
| AS Such | L | 96.57 | 59.03 | 37.54 | 73.17 | 23.4 | 95.66 | 0.910 |
| | A | −0.06 | 0.12 | −0.18 | −2.69 | 2.63 | −0.85 | 0.790 |
| | B | 0.98 | −7.69 | 8.67 | −3.2 | 4.18 | 0.48 | 0.500 |
| | C | 0.98 | 7.69 | −6.71 | 4.18 | −3.2 | 0.97 | 0.010 |
| | H | 93.44 | 270.89 | −177.45 | 229.92 | −136.48 | 150.65 | −57.210 |

TABLE 1-continued

|  |  |  |  |  |  |
|---|---|---|---|---|---|
| 24 hrs | L | 96.69 |  | 94.46 | 2.23 |
| 90 Deg C. | A | −0.18 |  | −1.2 | 1.02 |
|  | B | 1.11 |  | 1.73 | −0.62 |
|  | C | 1.13 |  | 2.1 | −0.97 |
|  | H | 99.07 |  | 124.84 | −25.77 |
| After 5 | L | 94.71 |  | 90.39 | 4.32 |
| Wash | A | 0.2 |  | 0.27 | −0.07 |
| @ 60 | B | −0.15 |  | 0.07 | −0.22 |
| Deg C./60 | C | 0.24 |  | 0.27 | −0.03 |
| Minutes | H | 323.46 |  | 14.54 | 308.92 |

|  |  | Formula 1, YC.021 | | Formula 2, YC.021 Garment | | | |
|---|---|---|---|---|---|---|---|
|  |  | 60:40 Polyester Blend | | 100% Black Polyester | | 60:40 Polyester Blend | |
|  | LABCH Values | Layer1: Formula 1 Layer2: YC.757 Layer3: YC.021 | Difference as compared to Standard | Layer1: Formula 2 Layer2: YC.757 Layer3: YC.021 | Difference as compared to Standard | Layer1: Formula 2 Layer2: YC.757 Layer3: YC.021 | Difference as compared to Standard |
| AS | L | 94.53 | 0.91 | 94.57 | 2 | 94.98 | 1.59 |
| Such | A | −0.97 | 0.79 | −0.79 | 0.73 | −0.77 | 0.71 |
|  | B | 1.37 | 0.5 | −0.1 | 1.08 | 1.11 | −0.13 |
|  | C | 1.68 | 0.01 | 0.79 | 0.19 | 1.35 | −0.37 |
|  | H | 125.22 | −57.21 | 187.4 | −93.96 | 124.7 | −31.26 |
| 24 hrs | L | 93.04 | 3.65 | 93.56 | 3.13 | 92.84 | 3.85 |
| 90 Deg C. | A | −0.63 | 0.45 | −0.79 | 0.61 | 0.35 | −0.53 |
|  | B | 5.29 | −4.18 | −0.24 | 1.35 | 5.96 | −4.85 |
|  | C | 5.32 | −4.19 | 0.82 | 0.31 | 5.97 | −4.84 |
|  | H | 96.82 | 2.25 | 197.2 | −98.13 | 93.35 | 5.72 |
| After 5 | L | 89.87 | 4.84 | 89.29 | 5.42 | 91.34 | 3.37 |
| Wash | A | −0.17 | 0.37 | 0.15 | 0.05 | −0.7 | 0.9 |
| @ 60 | B | 1.42 | −1.57 | −0.65 | 0.5 | 1.39 | −1.54 |
| Deg C./60 | C | 1.43 | −1.19 | 0.67 | −0.43 | 1.55 | −1.31 |
| Minutes | H | 96.7 | 226.76 | 283.8 | 39.66 | 116.69 | 206.77 |

TABLE 2

|  |  | W/O Dye Blocker Garment | | | | Formula 1, YC.042 | |
|---|---|---|---|---|---|---|---|
|  |  | White taken as Standard Layer1: YC.757 Layer2: YC.042 | 100% Black Polyester Layer1: YC.757 Layer2: YC.042 | Difference as compared to Standard | 60:40 Polyester Blend Layer1: YC.757 Layer2: YC.042 | Difference as compared to Standard | 100% Black Polyester Layer1: Formula 1 Layer2: YC.757 Layer3: YC.042 | Difference as compared to Standard |
|  | LABCH Values |  |  |  |  |  |  |
| AS | L | 92.67 | 50.7 | 41.97 | 55.18 | 37.49 | 92.13 | 0.54 |
| Such | A | −12.1 | −8.08 | −4.02 | −12.72 | 0.62 | −15.13 | 3.03 |
|  | B | 76.7 | 16.68 | 60.02 | 30.9 | 45.8 | 74.3 | 2.4 |
|  | C | 77.65 | 18.54 | 59.11 | 33.42 | 44.23 | 75.83 | 1.82 |
|  | H | 98.96 | 115.85 | −16.89 | 112.37 | −13.41 | 101.51 | −2.55 |
| 24 hrs | L | 93.05 |  |  |  |  | 89.76 | 3.29 |
| 90 Deg C. | A | −11.53 |  |  |  |  | −13.51 | 1.98 |
|  | B | 74.48 |  |  |  |  | 70.58 | 3.9 |
|  | C | 75.36 |  |  |  |  | 71.86 | 3.5 |
|  | H | 98.8 |  |  |  |  | 100.83 | −2.03 |
| After 5 | L | 91.74 |  |  |  |  | 87.34 | 4.4 |
| Wash | A | −12.72 |  |  |  |  | −13.04 | 0.32 |
| @ 60 | B | 72.21 |  |  |  |  | 65.95 | 6.26 |
| Deg C./60 | C | 73.32 |  |  |  |  | 67.23 | 6.09 |
| Minutes | H | 99.99 |  |  |  |  | 101.18 | −1.19 |

TABLE 2-continued

|  |  | Formula 1, YC.042 | | Formula 2, YC.042 | | | |
|---|---|---|---|---|---|---|---|
|  |  | Garment | | | | | |
|  |  | 60:40 Polyester Blend | | 100% Black Polyester | | 60:40 Polyester Blend | |
|  | LABCH Values | Layer1: Formula 1 Layer2: YC.757 Layer3: YC.042 | Difference as compared to Standard | Layer1: Formula 2 Layer2: YC.757 Layer3: YC.042 | Difference as compared to Standard | Layer1: Formula 2 Layer2: YC.757 Layer3: YC.042 | Difference as compared to Standard |
| AS Such | L | 90.88 | 1.79 | 91.57 | 1.1 | 90.02 | 2.65 |
|  | A | −14.26 | 2.16 | −13.31 | 1.21 | −10.72 | −1.38 |
|  | B | 70.76 | 5.94 | 74.54 | 2.16 | 71.37 | 5.33 |
|  | C | 72.18 | 5.47 | 75.72 | 1.93 | 72.17 | 5.48 |
|  | H | 101.4 | −2.44 | 100.12 | −1.16 | 98.54 | 0.42 |
| 24 hrs 90 Deg C. | L | 89.11 | 3.94 | 90.8 | 2.25 | 88.78 | 4.27 |
|  | A | −12.25 | 0.72 | −13.26 | 1.73 | −10.24 | 4.29 |
|  | B | 69.13 | 5.35 | 73.76 | 0.72 | 68.42 | 6.06 |
|  | C | 70.2 | 5.16 | 74.94 | 0.42 | 69.18 | 6.18 |
|  | H | 100.05 | 4.25 | 100.19 | −1.39 | 98.52 | 0.28 |
| After 5 Wash @ 60 Deg C./60 Minutes | L | 83.91 | 7.83 | 88.29 | 3.45 | 87.31 | 4.43 |
|  | A | −12.44 | −0.28 | −12.36 | −0.36 | −11.39 | −1.33 |
|  | B | 63.44 | 8.77 | 67.6 | 4.61 | 66.85 | 5.36 |
|  | C | 64.65 | 8.67 | 68.72 | 4.6 | 67.81 | 5.51 |
|  | H | 101.1 | −1.11 | 100.36 | −0.37 | 99.67 | 0.32 |

TABLE 3

|  |  | W/O Dye Blocker | 100% Black Polyester | | 60:40 Polyester Blend | | Formula 1, YC.134 100% Black Polyester | |
|---|---|---|---|---|---|---|---|---|
|  |  | Garment | | | | | | |
|  |  | White | | | | | | |
|  | LABCH Values | taken as Standard Layer1: YC.757 Layer2: YC.134 | Layer1: YC.757 Layer2: YC.134 | Difference as compared to Standard | Layer1: YC.757 Layer2: YC.134 | Difference as compared to Standard | Layer1: Formula 1 Layer2: YC.757 Layer3: YC.134 | Difference as compared to Standard |
| AS Such | L | 47.14 | 31.6 | 15.54 | 32.04 | 15.10 | 46.94 | 0.20 |
|  | A | 60.02 | 14.07 | 45.95 | 26.26 | 33.76 | 58.98 | 1.04 |
|  | B | 32.95 | 9.14 | 23.81 | 15.98 | 16.97 | 33.03 | −0.08 |
|  | C | 68.46 | 16.78 | 51.68 | 30.74 | 37.72 | 67.6 | 0.86 |
|  | H | 28.77 | 33.03 | −4.26 | 31.32 | −2.55 | 29.25 | −0.48 |
| 24 hrs 90 Deg C. | L | 46.97 |  |  |  |  | 45.79 | 1.18 |
|  | A | 58.24 |  |  |  |  | 54.37 | 3.87 |
|  | B | 33.27 |  |  |  |  | 29.57 | 3.7 |
|  | C | 67.07 |  |  |  |  | 61.89 | 5.18 |
|  | H | 29.74 |  |  |  |  | 28.54 | 1.2 |
| After 5 Wash @ 60 Deg C./60 Minutes | L | 46.98 |  |  |  |  | 46.16 | 0.82 |
|  | A | 55.84 |  |  |  |  | 53.79 | 2.05 |
|  | B | 32.2 |  |  |  |  | 30.75 | 1.45 |
|  | C | 64.45 |  |  |  |  | 61.96 | 2.49 |
|  | H | 29.97 |  |  |  |  | 29.76 | 0.21 |

|  |  | Formula 1, YC.134 | | Formula 2, YC.134 | | | |
|---|---|---|---|---|---|---|---|
|  |  | Garment | | | | | |
|  |  | 60:40 Polyester Blend | | 100% Black Polyester | | 60:40 Polyester Blend | |
|  | LABCH Values | Layer1: Formula 1 Layer2: YC.757 Layer3: YC.134 | Difference as compared to Standard | Layer1: Formula 2 Layer2: YC.757 Layer3: YC.134 | Difference as compared to Standard | Layer1: Formula 2 Layer2: YC.757 Layer3: YC.134 | Difference as compared to Standard |
| AS Such | L | 47.73 | −0.59 | 45.23 | 1.91 | 45.96 | 1.18 |
|  | A | 58.18 | 1.84 | 56.59 | 3.43 | 58.08 | 1.94 |
|  | B | 31.03 | 1.92 | 31.36 | 1.59 | 32.05 | 0.9 |
|  | C | 65.94 | 2.52 | 64.7 | 3.76 | 66.33 | 2.13 |
|  | H | 28.07 | 0.7 | 28.99 | −0.22 | 28.89 | −0.12 |

TABLE 3-continued

| | | | | | | | |
|---|---|---|---|---|---|---|---|
| 24 hrs | L | 46.06 | 0.91 | 45.65 | 1.32 | 46.13 | 0.84 |
| 90 Deg C. | A | 54.22 | 4.02 | 56.02 | 2.22 | 57.82 | 0.42 |
| | B | 29.38 | 3.89 | 30.58 | 2.69 | 32.08 | 1.19 |
| | C | 61.67 | 5.4 | 63.82 | 3.25 | 66.12 | 0.95 |
| | H | 28.45 | 1.29 | 28.63 | 1.11 | 29.02 | 0.72 |
| After 5 | L | 41.23 | 5.75 | 44.85 | 2.13 | 45.03 | 1.95 |
| Wash | A | 45.28 | 10.56 | 52.61 | 3.23 | 54.67 | 1.17 |
| @ 60 | B | 22.65 | 9.55 | 30.04 | 2.16 | 30.93 | 1.27 |
| Deg C./60 | C | 50.63 | 13.82 | 60.58 | 3.87 | 62.81 | 1.64 |
| Minutes | H | 26.57 | 3.4 | 29.73 | 0.24 | 29.5 | 0.47 |

TABLE 4

| | | White | 100% Black Polyester | | 60:40 Polyester Blend | | 100% Black Polyester | |
|---|---|---|---|---|---|---|---|---|
| | | W/O Dye Blocker Garment | | | | | Formula 1, YC.165 | |
| | LABCH Values | taken as Standard Layer1: YC.757 Layer2: YC.165 | Layer1: YC.757 Layer2: YC.165 | Difference as compared to Standard | Layer1: YC.757 Layer2: YC.165 | Difference as compared to Standard | Layer1: Formula 1 Layer2: YC.757 Layer3: YC.165 | Difference as compared to Standard |
| AS Such | L | 47.12 | 28.59 | 18.53 | 29.62 | 17.5 | 48.95 | −1.83 |
| | A | 60.17 | 12.94 | 47.23 | 25.94 | 34.23 | 61.42 | −1.25 |
| | B | −8.4 | −9.88 | 1.48 | −12.59 | 4.19 | −10.75 | 2.35 |
| | C | 60.76 | 16.28 | 44.48 | 28.83 | 31.93 | 62.36 | −1.6 |
| | H | 352.05 | 322.63 | 29.42 | 334.1 | 17.95 | 350.08 | 1.97 |
| 24 hrs | L | 48.89 | | | | | 49.36 | −0.47 |
| 90 Deg C. | A | 61.85 | | | | | 60.04 | 1.81 |
| | B | −10.05 | | | | | −11.35 | 1.3 |
| | C | 62.66 | | | | | 61.1 | 1.56 |
| | H | 350.77 | | | | | 349.3 | 1.47 |
| After 5 | L | 46.47 | | | | | 47.26 | −0.79 |
| Wash | A | 57.6 | | | | | 56.15 | 1.45 |
| @ 60 | B | −9.16 | | | | | −11.27 | 2.11 |
| Deg C./60 | C | 58.32 | | | | | 57.27 | 1.05 |
| Minutes | H | 350.96 | | | | | 348.65 | 2.31 |

| | | Formula 1, YC.165 | | Formula 2, YC.165 | | | |
|---|---|---|---|---|---|---|---|
| | | 60:40 Polyester Blend | | 100% Black Polyester | | 60:40 Polyester Blend | |
| | LABCH Values | Layer1: Formula 1 Layer2: YC.757 Layer3: YC.165 | Difference as compared to Standard | Layer1: Formula 2 Layer2: YC.757 Layer3: YC.165 | Difference as compared to Standard | Layer1: Formula 2 Layer2: YC.757 Layer3: YC.165 | Difference as compared to Standard |
| AS Such | L | 51.05 | −3.93 | 47.5 | −0.38 | 48.14 | −1.02 |
| | A | 60.42 | −0.25 | 58.84 | 1.33 | 60.55 | −0.38 |
| | B | −12.82 | 4.42 | −11.09 | 2.69 | −10.44 | 2.04 |
| | C | 61.77 | −1.01 | 59.87 | 0.89 | 61.44 | −0.68 |
| | H | 348.02 | 4.03 | 349.33 | 2.72 | 350.22 | 1.83 |
| 24 hrs | L | 49.67 | −0.78 | 47.98 | 0.91 | 47.88 | 1.01 |
| 90 Deg C. | A | 59.12 | 2.73 | 58.56 | 3.29 | 59.24 | 2.61 |
| | B | −9.06 | −0.99 | −10.61 | 0.56 | −8.27 | −1.78 |
| | C | 59.81 | 2.85 | 59.52 | 3.14 | 59.81 | 2.85 |
| | H | 351.29 | −0.52 | 349.73 | 1.04 | 352.05 | −1.28 |
| After 5 | L | 49.24 | −2.77 | 46.24 | 0.23 | 49.01 | −2.54 |
| Wash | A | 56.86 | 0.74 | 55.22 | 2.38 | 58.68 | −1.08 |
| @ 60 | B | −11.76 | 2.6 | −10.78 | 1.62 | −12.62 | 3.46 |
| Deg C./60 | C | 58.07 | 0.25 | 56.26 | 2.06 | 60.02 | −1.7 |
| Minutes | H | 348.31 | 2.65 | 348.96 | 2 | 347.87 | 3.09 |

TABLE 5

| | | | W/O Dye Blocker Garment | | | | Formula 1, YC.077 | |
|---|---|---|---|---|---|---|---|---|
| | | White | 100% Black Polyester | | 60:40 Polyester Blend | | 100% Black Polyester | |
| | LABCH Values | taken as Standard Layer1: YC.757 Layer2: YC.077 | Layer1: YC.757 Layer2: YC.077 | Difference as compared to Standard | Layer1: YC.757 Layer2: YC.077 | Difference as compared to Standard | Layer1: Formula 1 Layer2: YC.757 Layer3: YC.077 | Difference as compared to Standard |
| AS Such | L | 100.98 | 45.25 | 55.73 | 62.54 | 38.44 | 100.98 | 0 |
| | A | −37.37 | −14.65 | −22.72 | −25.17 | −12.2 | −40.03 | 2.66 |
| | B | 76.15 | 27.82 | 48.33 | 47.94 | 28.21 | 85.1 | −8.95 |
| | C | 84.82 | 31.44 | 53.38 | 54.15 | 30.67 | 94.04 | −9.22 |
| | H | 116.14 | 117.77 | −1.63 | 117.7 | −1.56 | 115.19 | 0.95 |
| 24 hrs 90 Deg C. | L | 100.94 | | | | | 98.04 | 2.9 |
| | A | −36.44 | | | | | −37.98 | 1.54 |
| | B | 73.36 | | | | | 80.54 | −7.18 |
| | C | 81.91 | | | | | 89.04 | −7.13 |
| | H | 116.42 | | | | | 115.25 | 1.17 |
| After 5 Wash @ 60 Deg C./60 Minutes | L | 96.06 | | | | | 94.59 | 1.47 |
| | A | −30.87 | | | | | −33.15 | 2.28 |
| | B | 59.84 | | | | | 71.4 | −11.56 |
| | C | 67.33 | | | | | 78.72 | −11.39 |
| | H | 117.28 | | | | | 114.91 | 2.37 |

| | | Formula 1, YC.077 | | Formula 2, YC.077 | | | |
|---|---|---|---|---|---|---|---|
| | | Garment | | | | | |
| | | 60:40 Polyester Blend | | 100% Black Polyester | | 60:40 Polyester Blend | |
| | LABCH Values | Layer1: Formula 1 Layer2: YC.757 Layer3: YC.077 | Difference as compared to Standard | Layer1: Formula 2 Layer2: YC.757 Layer3: YC.077 | Difference as compared to Standard | Layer1: Formula 2 Layer2: YC.757 Layer3: YC.077 | Difference as compared to Standard |
| AS Such | L | 100.63 | 0.35 | 98.88 | 2.1 | 98.94 | 2.04 |
| | A | −39.34 | 1.97 | −38.68 | 1.31 | −38.53 | 1.16 |
| | B | 85.55 | −9.4 | 83.5 | −7.35 | 83.99 | −7.84 |
| | C | 94.16 | −9.34 | 92.08 | −7.26 | 92.41 | −7.59 |
| | H | 114.7 | 1.44 | 114.86 | 1.28 | 114.64 | 1.5 |
| 24 hrs 90 Deg C. | L | 96.06 | 4.88 | 89.28 | 11.66 | 95.75 | 5.19 |
| | A | −31.84 | −4.6 | −25.81 | −10.63 | −33.73 | −2.71 |
| | B | 72.97 | 0.39 | 55.51 | 17.85 | 73.87 | −0.51 |
| | C | 79.62 | 2.29 | 61.22 | 20.69 | 81.2 | 0.71 |
| | H | 113.57 | 2.85 | 114.94 | 1.48 | 114.55 | 1.87 |
| After 5 Wash @ 60 DegC./60 Minutes | L | 92.04 | 4.02 | 88.91 | 7.15 | 92.33 | 3.73 |
| | A | −28.15 | −2.72 | −28.5 | −2.37 | −29.89 | −0.98 |
| | B | 66.5 | −6.66 | 63.86 | −4.02 | 68.73 | −8.89 |
| | C | 72.21 | −4.88 | 69.94 | −2.61 | 74.94 | −7.61 |
| | H | 112.95 | 4.33 | 114.05 | 3.23 | 113.5 | 3.78 |

TABLE 6

| | | | W/O Dye Blocker Garment | | | | Formula 1, YC.119 | |
|---|---|---|---|---|---|---|---|---|
| | | White | 100% Black Polyester | | 60:40 Polyester Blend | | 100% Black Polyester | |
| | LABCH Values | taken as Standard Layer1: YC.757 Layer2: YC.119 | Layer1: YC.757 Layer2: YC.119 | Difference as compared to Standard | Layer1: YC.757 Layer2: YC.119 | Difference as compared to Standard | Layer1: Formula 1 Layer2: YC.757 Layer3: YC.119 | Difference as compared to Standard |
| AS Such | L | 83.36 | 38.05 | 45.31 | 51.84 | 31.52 | 81.67 | 1.69 |
| | A | 61.91 | 9.35 | 52.56 | 29.97 | 31.94 | 66.41 | −4.5 |
| | B | 62.37 | 6.47 | 55.9 | 29.89 | 32.48 | 66.7 | −4.33 |
| | C | 87.88 | 11.37 | 76.51 | 42.32 | 45.56 | 94.12 | −6.24 |
| | H | 45.22 | 34.68 | 10.54 | 44.92 | 0.3 | 45.12 | 0.1 |

TABLE 6-continued

| | | | | | | | |
|---|---|---|---|---|---|---|---|
| 24 hrs | L | 84.81 | | | | 79.35 | 5.46 |
| 90 Deg C. | A | 57.14 | | | | 62.66 | −5.52 |
| | B | 59.23 | | | | 60.67 | −1.44 |
| | C | 82.3 | | | | 87.22 | −4.92 |
| | H | 46.03 | | | | 44.07 | 1.96 |
| After 5 | L | 80.08 | | | | 76.97 | 3.11 |
| Wash | A | 52.07 | | | | 56.62 | −4.55 |
| @ 60 | B | 49.87 | | | | 50.65 | −0.78 |
| Deg C./60 | C | 72.1 | | | | 75.97 | −3.87 |
| Minutes | H | 43.76 | | | | 41.81 | 1.95 |

| | | Formula 1, YC.119 | | Formula 2, YC.119 | | | |
|---|---|---|---|---|---|---|---|
| | | | | Garment | | | |
| | | 60:40 Polyester Blend | | 100% Black Polyester | | 60:40 Polyester Blend | |
| | LABCH Values | Layer1: Formula 1 Layer2: YC.757 Layer3: YC.119 | Difference as compared to Standard | Layer1: Formula 2 Layer2: YC.757 Layer3: YC.119 | Difference as compared to Standard | Layer1: Formula 2 Layer2: YC.757 Layer3: YC.119 | Difference as compared to Standard |
| AS | L | 81.38 | 1.98 | 80.19 | 3.17 | 81.8 | 1.56 |
| Such | A | 58.28 | 3.63 | 65.44 | −3.53 | 58.32 | 3.59 |
| | B | 57.87 | 4.5 | 63.76 | −1.39 | 57.97 | 4.4 |
| | C | 82.13 | 5.75 | 91.37 | −3.49 | 82.22 | 5.66 |
| | H | 44.8 | 0.42 | 44.25 | 0.97 | 44.83 | 0.39 |
| 24 hrs | L | 79.65 | 5.16 | 74.3 | 10.51 | 80.01 | 4.8 |
| 90 Deg C. | A | 56.29 | 0.85 | 56.83 | 0.31 | 53.81 | 3.33 |
| | B | 54.16 | 5.07 | 51.06 | 8.17 | 50.56 | 8.67 |
| | C | 78.11 | 4.19 | 76.4 | 5.9 | 73.84 | 8.46 |
| | H | 43.9 | 2.13 | 41.94 | 4.09 | 43.22 | 2.81 |
| After 5 | L | 74.74 | 5.34 | 73.87 | 6.21 | 77.28 | 2.8 |
| Wash | A | 45.8 | 6.27 | 55.25 | −3.18 | 52.63 | −0.56 |
| @ 60 | B | 38.8 | 11.07 | 46.56 | 3.31 | 45.97 | 3.9 |
| Deg C./60 | C | 60.03 | 12.07 | 75.25 | −3.15 | 69.88 | 2.22 |
| Minutes | H | 40.28 | 3.48 | 40.12 | 3.64 | 41.13 | 2.63 |

As illustrated in the Tables 1 to 6, a lower value of L was observed for the prints on 100% polyester and 60:40 (polyester:cotton) without the plastisol based composition. The lower L values result from the bleeding of the polyester dye on to the top layer of the color print and turning the top color a darker shade.

The higher L values obtained using the plastisol based composition of the present disclosure shows that the polyester dye has not bled on to the top layer of the color print for the 100% black polyester and 60:40 (polyester:cotton) blend fabrics.

Technical Advances and Economic Significance

The present disclosure described herein above has several technical advantages including, but not limited to, the realization of a plastisol based composition for printing on polyester blended and 100% polyester fabrics;

that stops the migration of dye from the fabric into the print; and that is formaldehyde free, phthale free and free of vinyl chloride and hence, environment friendly.

The exemplary embodiments herein quantify the benefits arising out of this disclosure and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A plastisol based composition for use on a dyed polyester blended cotton fabric or 100% polyester fabric for blocking dye migration from said fabric into a print on the fabric, wherein said print is an overprint done with a plastisol based color dye on a layer of the dye blocking compound applied on said dyed fabric, said composition comprising:
   a. an acrylic based resin devoid of vinyl chloride moiety in an amount in the range of 15 to 45 wt % of the total weight of said composition;
   b. a plasticizer in an amount in the range of 20 to 55 wt % of the total weight of said composition;
   c. an organic wetting agent in an amount in the range of 5 to 35 wt % of the total weight of said composition;
   d. a formaldehyde free discharge agent in an amount in the range of 2 to 30 wt % of the total weight of said composition; and
   e. an extender in an amount in the range of 3 to 40 wt % of the total weight of said composition,
   wherein said plastisol based composition is in the form of an ink and is devoid of water, formaldehyde, phthalate and vinyl chloride.

2. A plastisol based composition for use on a dyed polyester blended cotton fabric or 100% polyester fabric for blocking dye migration from said fabric into a print on the fabric, wherein said print is an overprint done with a plastisol based color dye on a layer of the dye blocking compound applied on said dyed fabric, said composition comprising:
   31 wt % of acrylic resin with respect to the total weight of said composition;
   34.5 wt % of polyester adipate with respect to the total weight of said composition;
   10 wt % of 1,2-cyclohexane dicarboxylic acid diisononyl ester with respect to the total weight of said composition;
   8 wt % of white spirit with respect to the total weight of said composition;
   9 wt % of zinc sulfate heptahydrate with respect to the total weight of said composition;
   2 wt % of 2-amino-2-methyl-1-propanol solution with respect to the total weight of said composition;
   zeolite in an amount of 5 wt % of the total weight of said composition; and
   0.5 wt % of aerosol with respect to the total weight of said composition,
   wherein said plastisol based composition is in the form of an ink and is devoid of water, formaldehyde, phthalate and vinyl chloride.

3. The composition as claimed in claim 1, wherein said plasticizer is at least one selected from the group consisting of polyester adipate, 1,2 cyclohexane dicarboxylic acid diisononyl ester, and 2,2,4-trimethyl-1,3-pentanediol dibenzoate.

4. The composition as claimed in claim 1, wherein said organic wetting agent is at least one selected from white spirit, and mineral turpentine.

5. The composition as claimed in claim 1, wherein said formaldehyde free discharge agent has a structure of Formula I:

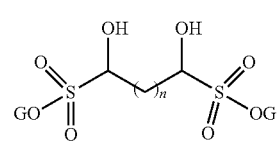

Formula I wherein G represents a group 1 metal, and n is in the range of 1 to 6.

6. The composition as claimed in claim 1, wherein said formaldehyde free discharge agent is an organic sulphur compound comprising at least one oxide of sulfur residue.

7. The composition as claimed in claim 1, wherein said extender is at least one selected from the group consisting of zeolite, activated carbon, fumed silica and hydrophilic silica.

8. A process for printing a plastisol based color ink on a blended polyester dyed cotton fabric or 100% polyester dyed fabric using said plastisol based composition of claim 1, said process comprising the following steps:
   applying at least two strokes of said plastisol based composition on said blended polyester dyed cotton fabric or 100% polyester dyed fabric to obtain a layer on said fabric;
   flash curing said layer on said fabric at a temperature in the range of 90 to 110° C. for a time period in the range of 2 to 6 seconds to obtain a flash cured plastisol based composition on said fabric;
   applying at least two strokes of a plastisol based white ink over said flash cured plastisol based composition on said fabric, followed by flash curing said plastisol based white ink at a temperature in the range of 90 to 100° C. for a time period in the range of 2 to 6 seconds to obtain a flash cured plastisol based white ink;
   applying a plastisol based color ink over said flash cured plastisol based white ink on said fabric to obtain a plastisol based color print on said fabric, and
   curing said plastisol based color print on said fabric at a temperature in the range of 140 to 180° C. for a time period in the range of 60 to 120 seconds to obtain the printed dyed fabric.

9. The process as claimed in claim 8, wherein said process further comprises mixing of said composition with methane sulphonic acid 1-hydroxy sodium salt in a ratio of 100:10 to obtain a homogenous mixture, prior to applying on said blended polyester fabric.

10. The process as claimed in claim 8, wherein said inks are allowed to dry before applying the next layer.

* * * * *